(12) United States Patent
Dominguez

(10) Patent No.: US 10,710,838 B2
(45) Date of Patent: Jul. 14, 2020

(54) METHOD AND MACHINE FOR PRODUCING BINDINGS

(71) Applicant: Airbus Operations S.A.S., Toulouse (FR)

(72) Inventor: Alain Dominguez, Toulouse (FR)

(73) Assignee: Airbus Operations S.A.S. (FR)

( * ) Notice: Subject to any disclaimer, the term of this patent is extended or adjusted under 35 U.S.C. 154(b) by 345 days.

(21) Appl. No.: 15/825,626

(22) Filed: Nov. 29, 2017

(65) Prior Publication Data

US 2018/0162680 A1 Jun. 14, 2018

(30) Foreign Application Priority Data

Dec. 13, 2016 (FR) ..................................... 16 62348

(51) Int. Cl.
*B65H 54/08* (2006.01)
*H01B 13/00* (2006.01)
(Continued)

(52) U.S. Cl.
CPC ............... *B65H 54/08* (2013.01); *B26D 7/28* (2013.01); *B65B 27/06* (2013.01); *H01B 13/0003* (2013.01); *H01B 13/012* (2013.01); *H01B 13/01263* (2013.01); *H02G 1/005* (2013.01); *B65H 2701/365* (2013.01); *H01B 13/01272* (2013.01); *H02G 3/32* (2013.01)

(58) Field of Classification Search
CPC .... B65H 65/005; B65H 67/052; B65H 54/72; B65H 2701/36; B65H 54/08; B65H 2701/365; B26D 7/28; H01B 13/0003; H01B 13/012; H01B 13/01272; H01B 13/01263; H02G 1/005; H02G 3/32; B65B 27/06
See application file for complete search history.

(56) References Cited

U.S. PATENT DOCUMENTS 4,387,863 A * 6/1983 Edmonston ............ B65H 75/14
242/118.4
4,456,199 A * 6/1984 Seibert ............... B65H 54/2875
242/485.6
(Continued)

FOREIGN PATENT DOCUMENTS

BR 8 207 143 A 7/1984
FR 2 371 277 A1 6/1978
TW 208 109 B 6/1993

*Primary Examiner* — Jimmy T Nguyen
(74) *Attorney, Agent, or Firm* — Lerner, David, Littenberg, Krumholz & Mentlik, LLP

(57) ABSTRACT

The method for producing bindings includes: positioning at least one binding bobbin on a machine having: a winding bobbin including a device for supporting and a notch, an electric motor which is coupled to the winding bobbin; and at least one shaft capable of receiving a binding bobbin, supporting a free end of the binding of the binding bobbin on the winding bobbin, by the device for supporting; supplying electricity to the electric motor of the machine to drive the winding bobbin in rotation, so as to wind the binding of the binding bobbin over a plurality of turns around the winding bobbin; stopping the supply of electricity to the electric motor of the machine; and in the region of the notch of the winding bobbin, cutting the plurality of turns of bindings wound onto the winding bobbin.

6 Claims, 1 Drawing Sheet

(51) Int. Cl.
*B26D 7/28* (2006.01)
*H02G 1/00* (2006.01)
*H01B 13/012* (2006.01)
*B65B 27/06* (2006.01)
*H02G 3/32* (2006.01)

(56) References Cited

U.S. PATENT DOCUMENTS

| 4,461,435 | A | * | 7/1984 | Kovalovsky | ......... | A01K 89/016 |
|---|---|---|---|---|---|---|
| | | | | | | 242/258 |
| 2006/0138271 | A1 | * | 6/2006 | Yamazaki | ............... | B65H 54/72 |
| | | | | | | 242/475.7 |
| 2009/0229502 | A1 | * | 9/2009 | Nich | .................... | B65H 75/285 |
| | | | | | | 112/279 |
| 2011/0309183 | A1 | * | 12/2011 | Imai | .................... | B65H 65/005 |
| | | | | | | 242/473.8 |

\* cited by examiner

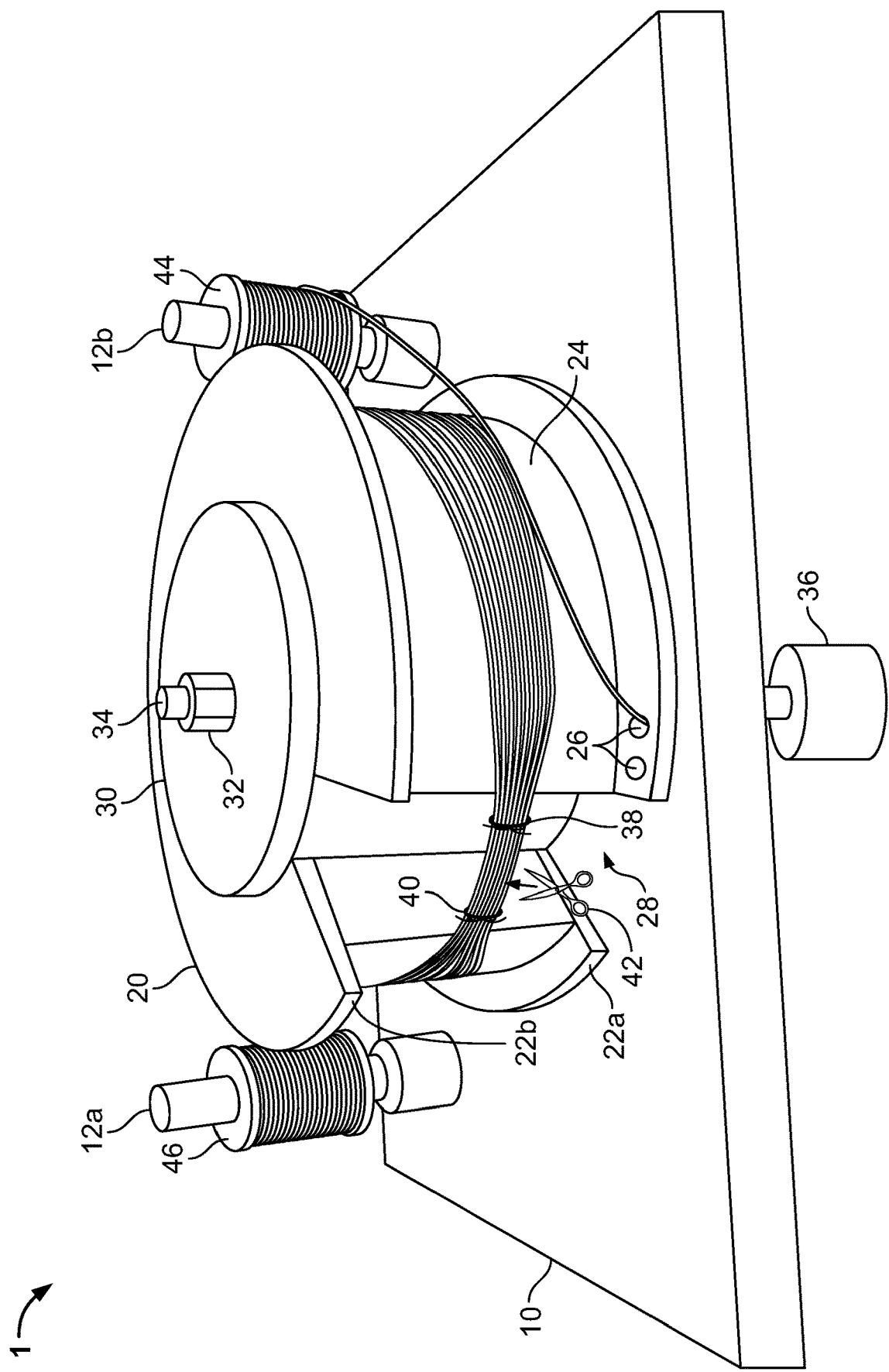

METHOD AND MACHINE FOR PRODUCING BINDINGS

FIELD OF THE INVENTION

The invention relates to the field of producing cable harnesses, in particular cable harnesses which are provided in aircraft.

BACKGROUND OF THE INVENTION

The aircraft, in particular transport planes, comprise a set of electrical cables which pass around the structure thereof. These electrical cables are grouped together into cable harnesses which each correspond to a set of cables. The different cables of a cable harness are attached together by means of connectors usually called "bindings". These bindings are positioned by operators: an operator uses a binding bobbin in which the bindings are cut to a length which is suitable for the diameter of the cable harness which the operator wishes to attach. Bindings of a length substantially equal to 75 cm are used, for example, in the conventional manner to produce cable harnesses which are provided in aircraft. The cutting of the bindings in a binding bobbin is a long and awkward operation, requiring many hours of work for an operator. As a result, it would be appropriate to be able to produce the bindings more rapidly.

BRIEF SUMMARY OF THE INVENTION

An aspect of the present invention may, in particular, provide a solution to this problem. The invention relates to a method for producing bindings. This method is noteworthy in that it comprises the following steps:
  positioning at least one binding bobbin on a machine comprising:
    a winding bobbin which is configured to be driven in rotation about an axis of rotation and comprising:
    a device for supporting which is configured to permit one end of a binding to be attached;
    a notch extending radially relative to the winding bobbin,
    an electric motor which is coupled to the winding bobbin and capable of driving the winding bobbin in rotation about its axis when it is supplied with electricity;
  at least one shaft capable of receiving a binding bobbin,
  supporting a free end of the binding of the binding bobbin on the winding bobbin, by means of the device for supporting the winding bobbin;
  supplying electricity to the electric motor of the machine for driving the winding bobbin in rotation, so as to wind the binding of the binding bobbin over a plurality of turns around the winding bobbin;
  stopping the supply of electricity to the electric motor of the machine;
  in the region of the notch of the winding bobbin, cutting said plurality of turns of bindings wound onto the winding bobbin.

Thus, by selecting a winding bobbin having a perimeter corresponding to the length of the bindings to be produced, the method permits a set of bindings to be produced which only requires a reduced number of manual operations on the part of the operator. A single cutting step is required to cut said plurality of turns of bindings wound onto the winding bobbin and thus to produce the set of bindings. Moreover, the step of winding the binding onto the winding bobbin is rapid given that the rotation of the winding bobbin is motorized. The set of bindings cut in a binding bobbin may thus be produced in just a few minutes.

In one advantageous embodiment, the method comprises the following step, before the step consisting of cutting said plurality of turns of bindings wound onto the winding bobbin:
  in the region of the notch of the winding bobbin, positioning at least one first tie about said plurality of turns of bindings wound onto the winding bobbin.

Further advantageously, the method further comprises the following step, before the step consisting of cutting said plurality of turns of bindings wound onto the winding bobbin:
  in the region of the notch of the winding bobbin, positioning at least one second tie, remote from the first tie, around said plurality of turns of bindings wound onto the winding bobbin,
  and, during the step consisting of cutting said plurality of turns of bindings wound onto the winding bobbin, cutting said plurality of turns of bindings between the first tie and the second tie.

The invention also relates to a machine for producing bindings. This machine is noteworthy in that it comprises:
  at least one shaft capable of receiving a binding bobbin;
  a winding bobbin which is configured to be driven in rotation about an axis of rotation and comprising:
  a device for supporting which is configured to permit one end of a binding to be attached to the winding bobbin; and
  a notch extending radially relative to the winding bobbin,
    an electric motor coupled to the winding bobbin and capable of driving the winding bobbin in rotation about its axis when it is supplied with electricity, so as to permit the binding of a binding bobbin to be wound over a plurality of turns around the winding bobbin when the binding bobbin is positioned on the shaft which is capable of receiving the binding bobbin and a free end of the binding of the binding bobbin is supported on the winding bobbin by means of the device for supporting the winding bobbin,
    the notch of the winding bobbin being configured to permit the passage of a cutting tool to cut said plurality of turns of bindings wound onto the winding bobbin.

In one particular embodiment, the machine further comprises a second shaft which is capable of receiving a second binding bobbin.

Advantageously, the notch of the winding bobbin is configured to permit the positioning of a first tie and a second tie, remote from the first tie, around said plurality of turns of bindings wound onto the winding bobbin.

BRIEF DESCRIPTION OF THE DRAWINGS

The invention will be understood more clearly by reading the following description and by examining the accompanying FIGURE.

FIGURE illustrates schematically a machine for producing bindings according to an embodiment of the invention.

DETAILED DESCRIPTION

The machine 1 shown in the Figure comprises a frame 10, a winding bobbin 20 and two shafts 12a, 12b each capable of receiving a binding bobbin 44, 46 being arranged thereon. The winding bobbin 20 is arranged so that its axis of rotation is perpendicular to a planar surface of the frame 10. The winding bobbin 20 comprises a winding surface 24 which is delimited by two edges 22*a* and 22*b* located in the extension, respectively, of a lower face and an upper face of the winding bobbin. The concept of lower face and upper face is considered in the position of the winding bobbin as shown in the figure. The perimeter of the winding surface 24 is selected so as to correspond to the desired length of the bindings to be produced using the machine, for example 75 cm. The machine also comprises an electric motor located below the frame 10 and fixedly mounted on said frame, schematically illustrated by 36. A shaft 34, capable of being driven in rotation by the motor, axially traverses the winding bobbin 20. The winding bobbin 20 is fixedly mounted on the shaft 34. To achieve this, a disk 30 traversed in its centre by the shaft 34 is positioned on the upper face of the winding bobbin. A further disk similar to the disk 30, but not visible in the figure, is positioned below the lower face of the winding bobbin. A nut screwed to the shaft 34 and positioned below said other disk permits a vertical support of this other disk so as to hold it at a distance from the frame 10. A nut 32 is screwed to the shaft 34 so as to clamp the disk 30 against the upper face of the winding bobbin. The winding bobbin 20 is thus positioned between the disk 30 and the other disk. It is held clamped between these two disks which permits it to be fixed to the shaft 34. The edge 22*a* of the winding bobbin comprises two through-holes 26. The machine 1 also comprises a cable for supplying electricity to the motor and a switch mounted in series on this cable. The winding bobbin 20 comprises a notch 28 extending radially relative to said winding bobbin.

To produce the bindings by means of the machine, according to a method according to an exemplary embodiment of the invention, an operator places a binding bobbin 44, 46 on each of the shafts 12*a* and 12*b*, respectively. The operator grips one free end of the binding of each of the binding bobbins, passes this free end into the holes 26 of the winding bobbin 20 and ties this free end so as to attach it to the winding bobbin. The Figure shows a free end of the binding from the binding bobbin 44 passing through a hole 26. The holes 26 thus provide the role of a device for supporting the binding on the winding bobbin. In one variant, these holes 26 are replaced by a lug fixed to one of the edges of the winding bobbin and the operator ties the free end of the binding around the lug. The operator then closes the switch, which permits the motor to be supplied with electricity. The motor then drives the winding bobbin 20 in rotation about its axis of rotation. Since the binding of each of the bobbins is attached to the winding bobbin, the binding is unwound from its bobbin and is wound onto the winding surface 24 due to the rotation of the winding bobbin. When the binding bobbins are empty, the operator opens the switch, which has the effect of stopping the motor and as a result the rotation of the winding bobbin. The binding from each of said bobbins is thus wound over a plurality of turns around the winding bobbin 20, as shown in the drawing. In the region of the notch 28 of the winding bobbin, the operator positions a first tie 38 around said plurality of turns of bindings wound onto the winding bobbin. Advantageously, the operator also positions, in the region of the notch 28 of the winding bobbin, a second tie 40 around said plurality of turns of bindings wound onto the winding bobbin. This second tie 40 is arranged remotely from the first tie 38 so as to permit the passage of a cutting tool 42 between the first tie 38 and the second tie 40. The cutting tool corresponds, for example, to scissors or cutting pliers. The operator then passes such a cutting tool 42 between the first tie and the second tie around the set of turns of bindings wound onto the winding bobbin and then cuts these turns of bindings. The operator is then able to remove these turns of bindings from the winding bobbin. The notch 28 is configured such that the operator is able to position the first tie 38 and the second tie 40 around the set of turns of bindings, these two ties being sufficiently remote from one another to permit the passage of the cutting tool between these two ties. Since the set of turns of bindings are cut in the region of the notch 28 of the winding bobbin, each turn of the bindings becomes a portion of the bindings, called a binding in the remainder of the description, the length thereof substantially corresponding to the perimeter of the winding surface 24 of the winding bobbin. The method according to the invention thus permits a number of bindings to be produced, corresponding to the number of turns of bindings wound onto the winding bobbin. By using two binding bobbins 44, 46 arranged on the first shaft 12*a* and on the second shaft 12*b*, respectively, the method permits approximately 500 bindings having a length of approximately 75 cm each to be produced in just a few minutes. According to further embodiments of the invention, it is possible to use a different number of binding bobbins, for example a single bobbin, three bobbins or four bobbins (by using a machine comprising shafts capable of receiving these bobbins). The number of bindings produced is thus modified according to the number of binding bobbins used.

The bindings produced are attached together in the vicinity of a first end by the first tie and in the vicinity of a second end by the second tie since the operator has cut the set of turns of bindings between these two ties. This is advantageous for the storage of the set of bindings produced, in anticipation of their use. In a variant of the method, the operator positions just the first tie before cutting the set of turns of bindings. The bindings produced are then attached together solely by the first tie in the vicinity of their first end. In a further variant, the operator does not position a tie before cutting the set of turns of bindings. The bindings produced are thus not attached together.

In one particular embodiment, the speed of rotation of the winding bobbin 20 is selected within a range of 250 to 350 rpm.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing bindings, the method comprises:
   positioning at least one binding bobbin on a machine comprising:
      a winding bobbin configured to be driven in rotation about an axis of rotation and comprising:
      a device for supporting configured to permit one end of a binding to be attached; and
      a notch extending radially relative to the winding bobbin, an electric motor coupled to the winding bobbin and configured for driving the winding bobbin in rotation about its axis when the electric motor is supplied with electricity; and at least one shaft capable of receiving a binding bobbin, supporting a free end of the binding of the binding bobbin on the winding bobbin, by the device for supporting the winding bobbin;

supplying electricity to the electric motor of the machine to drive the winding bobbin in rotation, so as to wind the binding of the binding bobbin over a plurality of turns around the winding bobbin;

stopping the supply of electricity to the electric motor of the machine; and in the region of the notch of the winding bobbin, cutting said plurality of turns of bindings wound onto the winding bobbin.

2. The method as claimed in claim 1, further comprising, before the step of cutting said plurality of turns of bindings wound onto the winding bobbin:

in the region of the notch of the winding bobbin, positioning at least one first tie around said plurality of turns of bindings wound onto the winding bobbin.

3. The method as claimed in claim 2, further comprising, before the step of cutting said plurality of turns of bindings wound onto the winding bobbin:

in the region of the notch of the winding bobbin, positioning at least one second tie, remote from the first tie, around said plurality of turns of bindings wound onto the winding bobbin, and, during the step of cutting said plurality of turns of bindings wound onto the winding bobbin, cutting said plurality of turns of bindings between the first tie and the second tie.

4. A machine for producing bindings, the machine comprises:

at least one shaft configured for receiving a binding bobbin;

a winding bobbin configured to be driven in rotation about an axis of rotation and comprising:

a device for supporting which is configured to permit one end of a binding to be attached to the winding bobbin; and a notch extending radially relative to the winding bobbin, an electric motor coupled to the winding bobbin and configured for driving the winding bobbin in rotation about its axis when the electric motor is supplied with electricity, so as to permit the binding of a binding bobbin to be wound over a plurality of turns around the winding bobbin when the binding bobbin is positioned on the shaft configured for receiving the binding bobbin and a free end of the binding of the binding bobbin is supported on the winding bobbin by the device for supporting the winding bobbin, the notch of the winding bobbin being configured to permit the passage of a cutting tool to cut said plurality of turns of bindings wound onto the winding bobbin.

5. The machine as claimed in claim 4, further comprising a second shaft configured for receiving a second binding bobbin.

6. The machine as claimed in claim 4, wherein the notch of the winding bobbin is configured to permit the positioning of a first tie and a second tie, remote from the first tie, around said plurality of turns of bindings wound onto the winding bobbin.

* * * * *